United States Patent
Hiers et al.

[11] Patent Number: 6,109,389
[45] Date of Patent: Aug. 29, 2000

[54] ACOUSTICAL INSULATING BARRIER AND METHOD OF MAKING THE BARRIER

[75] Inventors: John J. Hiers, Elkin; John K. Fletcher, Winston-Salem, both of N.C.

[73] Assignee: Lydall, Inc., Manchester, Conn.

[21] Appl. No.: 09/309,574

[22] Filed: May 11, 1999

[51] Int. Cl.$^7$ .................................................. E04B 1/82
[52] U.S. Cl. ........................ 181/290; 181/286; 428/95; 428/220
[58] Field of Search .................................... 181/290, 293, 181/286, 287, 294, 295; 428/95, 96, 97, 201, 215, 218, 219, 220

[56] References Cited

U.S. PATENT DOCUMENTS

| | | |
|---|---|---|
| 4,056,161 | 11/1977 | Allen, Jr. . |
| 4,522,876 | 6/1985 | Hiers ......................................... 428/95 |
| 4,847,140 | 7/1989 | Jaskowski ............................... 428/220 |
| 4,966,799 | 10/1990 | Lucca et al. . |
| 5,068,001 | 11/1991 | Haussling . |
| 5,266,143 | 11/1993 | Albera et al. . |
| 5,547,731 | 8/1996 | Tesch ........................................ 428/95 |

*Primary Examiner*—Khanh Dang
*Attorney, Agent, or Firm*—Birch, Stewart, Kolasch & Birch, LLP

[57] ABSTRACT

A needled composite acoustical barrier is provided. The barrier has a non-woven first layer (13) of needleable textile first fibers (13a); the layer (13) has a thickness of between about 0.01 inch and 0.5 inch and a density of between about 1.0 and 10 lbs. per cubic foot. A non-woven, low density second layer (15) of textile second fibers (15a) is provided; the second layer (15) has a thickness of between about 0.2 inch and 5 inches and a density of between about 0.1 and 4.0 lbs. per cubic foot. A high-density intermediate acoustical barrier layer (14) is disposed between the first and second layers (13, 15); the intermediate barrier layer (14) has a thickness of between about 0.01 inch and 0.5 inch, a density of at least 50 lbs. per cubic foot, and the barrier layer has a substantially continuous film of high-density needleable polymeric material. A plurality of needled stitches (19), formed from the first fibers (13a), extend from the first layer (13), through the intermediate barrier layer (14) and at least into the second layer (15).

62 Claims, 3 Drawing Sheets

ACOUSTICAL INSULATING BARRIER AND METHOD OF MAKING THE BARRIER

The present invention relates to acoustical insulating barriers and methods of making the barriers, and more particularly to such barriers which have significant acoustical insulating properties to sounds having a frequency between about 20 and 400 Hz, which makes the insulating barrier particularly useful for applications in automobiles and like devices.

BACKGROUND OF THE INVENTION

A wide variety of insulating barriers has been proposed in the art for abating sound transmission from a source thereof to some protected area or enclosure. Notable examples of such sound barriers are those used for abating sound through walls of houses, buildings and the like, those used for abating sounds emanating from highways and expressways, those used for abating sounds from appliances, such as washing machines, dishwashers and the like, and those used for abating sounds from the exterior of an automobile to the interior of the automobile. The sounds to be abated vary considerably with the sources of the sounds, and such sounds can have quite wide frequency ranges, commencing with only a few Hertz up to thousands of Hertz. Thus, for every sound abatement application, it is necessary to provide an acoustical insulating barrier which is effective at the frequencies expected from the sound to be abated. For example, the usual sounds transmitted from the exterior of an automobile to the interior thereof generally have frequencies from about 20 to 400 Hz. These sounds are generated by tire and road noise, engine noise, wind noise, noise from flexing of the automobile chassis or body, and noise from vibrations of movable and static mechanical components.

Accordingly, considerable effort has been expended in the art to provide acoustical insulating barriers which are effective in that frequency range, so that sound abatement can be provided to the interior of an automobile or like vehicle, although such acoustical insulating barriers are useful in other applications, such as dishwashers, washing machines, dryers, furnaces and like appliances. It has been found that sounds in those frequencies and up to frequencies of approximately 1000 Hz, and for some purposes up to 2000 Hz, are more effectively abated by use of a high density material which is, ideally, not in physical contact with the source of the sound or an object which transmits the sound. For example, the interior of an automobile is routinely acoustically insulated from sound transmitted through the floorboard, which sound originates from tires and road noises, wind noises, engine noises, and noise from vibration of mechanical and structural parts of the automobile. To isolate the acoustical barrier from that transmitting floorboard, to the extent possible, it is a common practice in the art to provide a fibrous material between the sound barrier and the floorboard. This material dampens sound transmissions and mechanical vibrations which would otherwise be transmitted directly to and through the acoustical insulating barrier. Thus, direct physical contact of the sound barrier is avoided by such material which spaces the acoustical insulating barrier from the floorboard. A wide variety of such materials has been used in the art, including non-woven textile fabrics, particularly "shoddy" fabrics, foamed polymeric materials, and the like. These materials are referred to in the art as a "suspending layer".

Very typically, the high-density acoustical insulating material is in the form of a layer of synthetic material (sometimes referred to as "mastic"). That synthetic material can take various forms, but typically will be made of a bituminous material or a bituminous/rubber material or a polymeric material which is either dense in and of itself and/or has added thereto densifying materials in order to be more effective in the relevant frequencies.

Typically, the acoustical insulating barrier layer (mastic) is glued to the suspending layer so that a composite is formed of the insulating barrier layer and suspending layer. In the case of an automobile, for example, that composite acoustical insulating barrier is placed under the cabin carpet of the automobile, although it may also be placed under the felt or carpet used in the trunk of the automobile or between the trunk liner and the body of the automobile or between the head liner and the roof of the automobile.

However, in each such application, in modern automobile production, the automobile manufacturers usually require that the supplier of the carpet, trunk floor felt, etc., provide those units in a ready-to-be-installed form. This means that each of the units, for example, the carpet covering the floorboard in front of the driver and front passenger seat, has been molded to the general configuration of that portion of the floorboard and the acoustical barrier has been attached thereto. This simplifies the assembly of the automobile, in that the carpet and acoustical insulating barrier can be quickly placed on the floorboard of the automobile during assembly, and it will snugly fit the contours of that portion of the floorboard. Hence, little time is required in installing that portion of the carpet/acoustical insulating barrier assembly.

In view of the foregoing, typically, a supplier of the carpet for the automobile will adhesively bond the acoustical insulating barrier, consisting of the barrier layer and suspending layer, to the underside of the carpet and then mold that assembly into the generally required configuration, as explained above.

Since the acoustical insulating barrier layer is glued to the suspending layer and the acoustical insulating barrier layer is, in turn, glued to the underside of the carpet, two different glue lines are required for that assembly, with one glue line being applied by the manufacturer of the acoustical insulating barrier and another glue line being applied by the manufacturer of the assembly of the carpet and the acoustical insulating barrier.

Since all conventional glues of this nature contain some fugitive component, e.g. solvent, for environmental purposes, containment systems must be provided both in the manufacture of the acoustical insulating barrier and in the manufacture of the assembly of acoustical insulating barrier and carpet. This significantly increases the cost of both of the acoustical insulating barrier and the assembled acoustical insulating barrier and carpet.

In addition, since the prior art acoustical insulating barrier layers are relatively heavy (typical weights of about 12 to 14 ounces are per square foot), the prior art acoustical insulating barriers made therewith considerably contribute to an increased overall weight of the automobile, which is quite undesirable.

Further, while the glue lines, as explained above, are cured, solvent and other fugitive volatiles, i.e. plasticizers, of the glue used in the glue line cannot be totally removed during manufacture of the acoustical insulating barrier or the assembly of the barrier and the carpet. Those volatiles slowly evaporate from the assembly, after being installed in the automobile, and contribute to the well known film of oily deposit that collects on windshields, glasses, back windshields, door panels and the like, especially, in a new automobile. The automobile manufacturers have, of course, long sought means of reducing that oily film, and the use of such glue lines in the typical acoustical insulating barrier and the assembled barrier and carpet only increase the incidents of the oily film.

As illustrations of the prior art mentioned above, U.S. Pat. No. 4,056,161 to Allen discloses a sound barrier having an outer layer of wear-resistant properties made of a polymer, e.g. polyvinyl chloride, and a sound barrier layer of high-density material filled with particulate material, such as barium sulfate. The sound barrier layer is preferably a vinyl plastisol. In turn, the sound barrier layer is bonded to a suspending layer at its undermost side, which suspending layer is preferably a polyurethane foam. The composite is bound together by heating the composite and allowing the vinyl plastisol of the barrier layer to bond the three layers together. This older product, however, has the disadvantages described above in that the composite assembly is essentially that of an adhesive operation via the vinyl plastisol, and off-gassing of condensable volatiles from that vinyl plastisol can be considerable, which is quite undesired, as noted above.

U.S. Pat. No. 4,966,799 discloses an automobile sound barrier made of fibers and filled with a filler. It is adhesively bonded to a suspending layer and can include a carpet for the automobile. Here again, adhesive bonding of the layers is required.

U.S. Pat. No. 5,266,143 is directed to an automobile sound barrier where a substrate of an elastomer or synthetic rubber, which is filled with a filler, is bonded to a porous fibrous layer by adhesion bonding.

U.S. Pat. No. 5,068,001 describes a sound barrier for automobiles, where a fibrous core is adhesively bonded to fibrous reinforcing mats on each side of the core by way of coating the reinforcing mats with uncured thermosetting resin and molding the composite in a heated mold where the thermosetting resin is cured.

In view of the above-discussed state of the art, it would be a substantial advantage in the art to provide an acoustical insulating barrier which can provide the acoustical insulation of the prior art acoustical insulating barrier, as described above, but which does not require glue for production of the barrier or for the assembly of the barrier and carpet, and, hence, avoid the costly environmental containment required by the barrier manufacturer and the manufacturer of the carpet and barrier assembly, as well as reduce oily volatiles. In addition, it would be a considerable advantage to the art to provide an acoustical insulating barrier which can abate sound as well as the conventional barrier, but with considerably less weight per square unit (lower density) and at a considerably lower cost per square unit.

BRIEF DESCRIPTION OF THE INVENTION

The present invention is based on several primary and subsidiary discoveries.

As a first primary discovery, it was found that an acoustical insulating barrier could be prepared without adhesive bonding, e.g. without a glue line, between the barrier layer and the suspending layer, and thus obviate the problems associated therewith, as described above. According to the invention, the barrier layer and suspending layer can be attached to each other, thus forming the acoustical insulating barrier, by a plurality of needled stitches passing through the barrier layer and the suspending layer. This eliminates the need for adhesive bonding, i.e. the glue line, between the barrier layer and the suspending layer. As a subsidiary discovery in this regard, it was found that if the suspending layer is of certain thicknesses and densities, such needling can be achieved so as to firmly lock the barrier layer to the suspending layer but at the same time not decrease the suspending properties of the suspending layer, as described above.

As another primary discovery, it was found that the needled stitches could be provided by a layer of needleable textile fibers disposed on the barrier layer so that the needleable textile fibers of that layer form the stitches which pass through the barrier layer. As a subsidiary discovery in this regard, it was found that such needling can take place from that layer of needleable textile fibers when that layer of fibers is of certain thicknesses and densities.

As a further subsidiary discovery, it was found that a layer of such needleable textile fibers may be placed both on and under the barrier layer and needling can be performed from both the top and bottom of the acoustical barrier to provide increased consolidation of the acoustical barrier during needling thereof.

Thus, as can be appreciated from the above, in the present acoustical barrier, there is a first layer of the needleable textile fibers disposed on the top of the barrier layer, and the barrier layer is disposed on the second suspending layer, i.e. the barrier layer is disposed between the first needleable textile fiber layer and the second suspending layer. However, in this regard, it was found that with such a sandwiched arrangement of the barrier layer, the barrier layer must have certain thicknesses and certain densities and comprise a substantially continuous film of high-density needleable polymeric material. With such a barrier layer, the stitches, formed from the first fiber layer of needleable textile fibers, can pass through that barrier layer and into the second suspending layer so as to bind the first fiber layer, the barrier layer and the second suspending layer into a composite which is sufficiently consolidated as to be easily handleable and manipulatable in attaching that assembled acoustical barrier to an underside of an automobile carpet or felt and place such an assembly in an automobile without any separation of the layers of the acoustical barrier.

As another primary discovery, it was found that when the first layer of needleable textile fibers also contains heat-fusible fibers, then the produced acoustical barrier can be heat fused to the underside of the carpet or felt, thus eliminating the glue line between the acoustical barrier and the underside of the carpet or felt.

Accordingly, briefly stated, the present invention provides a composite acoustical barrier. That acoustical barrier has a non-woven first layer of needleable textile first fibers. That first layer has a thickness of between about 0.01 inch and 0.5 inch and a density of between about 1 and 10 lbs. per cubic foot.

There is also provided a non-woven low-density second layer of textile fibers (which forms the suspending layer). That second layer has a thickness of between about 0.2 inch and 5 inches and a density of between about 0.1 and 4.0 lbs. per cubic foot.

A high-density acoustical barrier layer is disposed between the first and second layers. That intermediate barrier layer has a thickness of between about 0.01 inch and 0.5 inch and a density of at least about 50 lbs. per cubic foot, e.g. up to as much as 200 lbs. per cubic foot. That barrier layer comprises a substantially continuous film of high-density needleable polymeric material.

There are a plurality of needled stitches formed from the first fibers and extending from the first layer through the intermediate barrier layer and at least into the second layer.

There is also provided a method of producing a composite acoustical barrier. In that method, a composite is assembled of (i) a non-woven first layer of needleable textile first fibers, which first layer has a thickness of between about 0.01 inch and 0.5 inch and a density of between about 1 and 10 lbs. per cubic foot; (ii) a non-woven, low density second layer of textile second fibers (the suspending layer), which second layer has a thickness of between about 0.2 inch and 5 inches and a density of between about 0.1 and 4.0 lbs. per cubic foot; and (iii) a high density intermediate acoustical barrier layer disposed between the first and second layers, which intermediate barrier layer has a thickness of between about 0.01 inch and 0.5 inch and a density of at least about 50 lbs. per cubic foot, e.g. up to as much as 200 lbs. per cubic foot, and which barrier layer comprises a substantially continuous film of high density needleable polymeric material.

That composite is needled with about 100 to about 600 stitches per square inch, such that stitches formed from the first fibers extend from the first layer, through the intermediate barrier layer, and at least into the second layer.

Here again, preferably, that first layer contains heat-fusible fibers, such that the acoustical barrier can be heat fused to the underside of a carpet or felt, and thus eliminate the adhesive bonding, i.e. glue line, of the prior art in that position.

DETAILED DESCRIPTION OF PREFERRED EMBODIMENTS

Figure 1:
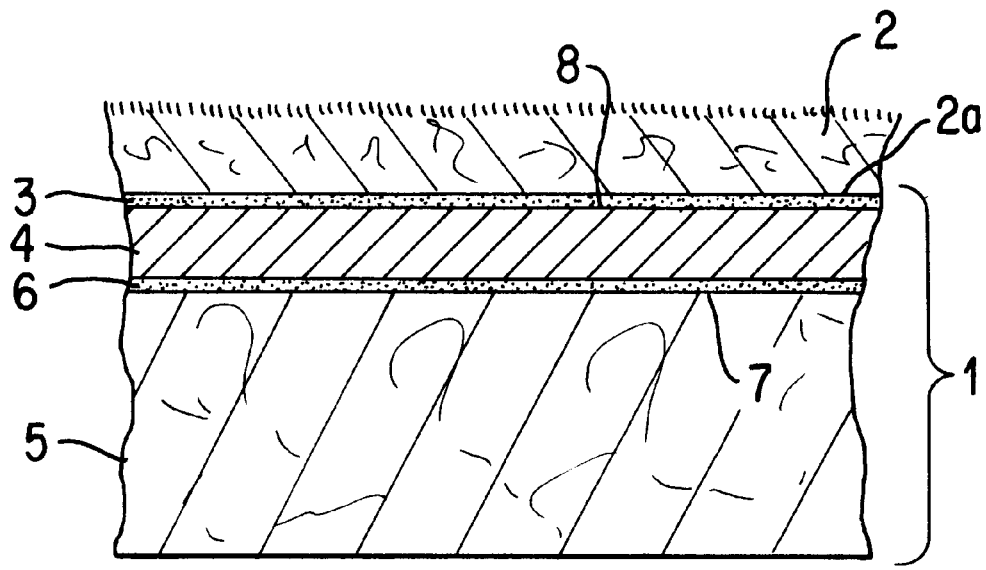
FIG. 1 is a diagrammatic cross-section of a typical prior art acoustical barrier glued to the underside of an automobile carpet.

As background to the present invention, FIG. 1 is a diagrammatic cross-section of a typical prior art acoustical barrier glued to the underside of an automobile carpet. That figure shows the acoustical barrier, generally 1, glued to a carpet 2 at the underside 2a thereof by way of a glue line 3. The acoustical barrier, generally 1, has a barrier layer 4 glued to a suspending layer 5 by way of a second glue line 6.

As noted above, in the prior art, the acoustical barrier 1 was produced by providing the suspending layer 5, placing a glue line 6 on a top surface 7 thereof and adhering the barrier layer 4 thereto by curing of that glue line 6. The manufacturer of the carpet assembly places a glue line 3 on the upper surface 8 of barrier layer 4 or the underside 2a of carpet 2 and then glues the underside 2a of carpet 2 to the barrier layer 4 by way of the glue line 3. In one conventional application of the prior art acoustical barriers, a so-called "mastic back" is applied to the underside 2a of carpet 2 which also functions as the glue line 3 and provides an acoustical barrier layer at the same time.

However, substantial problems exist in this prior art arrangement. First of all, the use of those two glue lines, i.e. glue lines 3 and 6, provides undesirable sources of off-gassing of fugitive or volatile glue components which can condense on the interior of the automobile after manufacture, as described above. This is quite undesirable. Secondly, it is very difficult to glue typical prior art barrier layers 4 to either the suspending layer 5 or the underside 2a of carpet 2. Therefore, the glue bond between carpet 2 and acoustical barrier 1 is a very unreliable bonding, and it is not unusual for the acoustical barrier 1 to separate from the carpet 2 when being installed in an automobile, which requires special and time-consuming hand labor for adequately installing the combination of carpet 2 and acoustical barrier 1 when those two have separated.

In addition, when the manufacturer assembles the combination of the acoustical barrier 1 and the carpet 2, the correct configuration for a particular automobile is cut from a supply of acoustical barrier 1 and a supply of carpet 2. When gluing acoustical barrier 1 and carpet 2 together, glue line 3 must be hand applied, e.g. by spraying, and this greatly increases the cost of the assembly of the carpet 2 and acoustical barrier 1 and also entails considerable and difficult environmental constraints, as noted above.

In addition, the same sort of difficulties are encountered in gluing barrier layer 4 to the suspending layer 5, and an unreliable glue bond often results. Further, the same hand labor and environmental considerations are involved in that glue line.

Further, in order to improve, to the degree possible, the adhesion of both the barrier layer 4 to the suspending layer 5 and the acoustical barrier 1 to the underside 2a of carpet 2, both glue lines 3 and 6 must be fairly thickly applied, and this increases the weight of the assembly. It is not unusual for an assembly of that nature with such glue lines to have a weight of about 14 ounces per square foot. In view of the number of square feet involved in carpeting an automobile, this weight considerably increases the overall weight of the automobile, which is quite undesirable.

Additionally, since the prior art acoustical barrier 1 and the assembly with carpet 2 require the glue lines 3 and 6, and in view of the difficulties of reliable glue bonding, as noted above, substantial limitations are placed on the materials which may be successfully used as the barrier layer 4. Those prior art barrier layers were often referred to as "mastics", since they resembled and/or in part are bituminous products which are also sources of condensable volatiles, as explained above.

Figure 2:
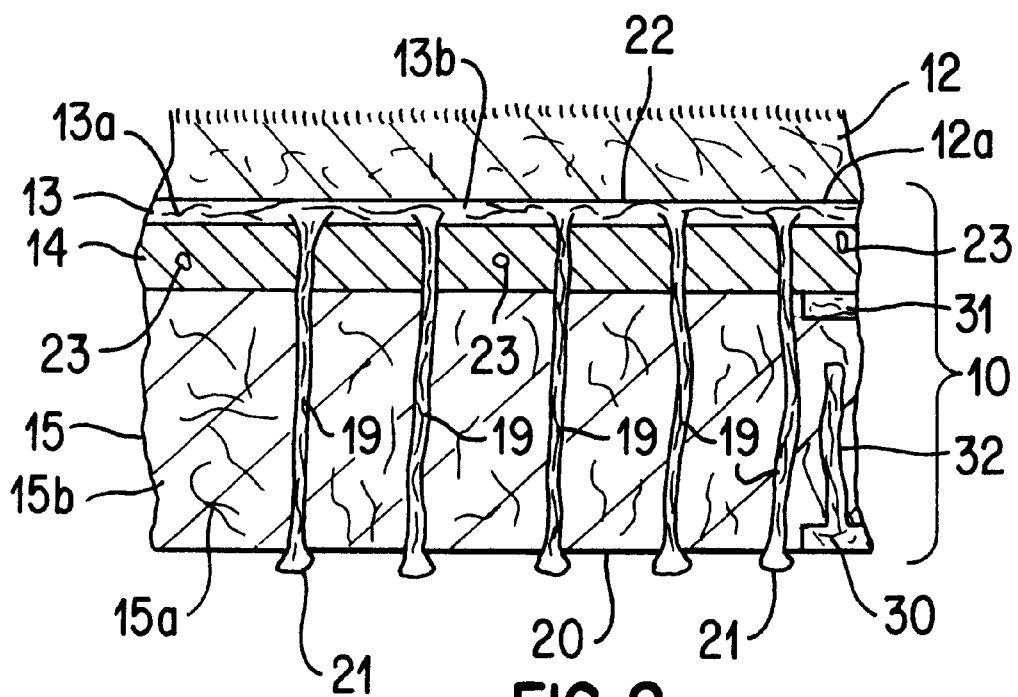
FIG. 2 is a diagrammatic cross-section of an embodiment of the present acoustical barrier fusion bonded to the underside of an automobile carpet.

FIG. 2 is a diagrammatic cross-section of the present acoustical barrier fusion bonded to the underside of an automobile carpet. As shown in that figure, the acoustical barrier, generally 10, is bonded to a carpet 12 at its underside 12a, but it will be noted that no glue line is involved therewith, as explained below. The acoustical barrier of the present invention has a non-woven first layer 13 of needleable textile first fibers 13a, a non-woven low density second layer 15 (suspending layer) of textile second fibers 15a, and a high density intermediate acoustical barrier layer 14.

There are a plurality of needled stitches 19 formed from the first fibers 13a that extend through the first layer 13, through the intermediate barrier layer 14 and at least into the suspending second layer 15.

The first layer 13 is relatively thin, since a major purpose of that layer is to provide first fibers 13a for forming stitches 19. In addition, as explained more fully below, the first fibers 13a of first layer 13 provide fusion bonding between acoustical barrier 10 and the underside 12a of carpet 12 by use of fusible fibers instead of a glue line. That fusion bonding, also, requires only a thin layer of the first fibers 13a. Thus, the first layer 13 has a thickness of between about 0.01 inch and 0.5 inch, preferably about 0.05 and 0.1 inch and a density of about 1 and 10 lbs. per cubic foot, more preferably about 3 to about 5 lbs. per cubic foot. This will provide sufficient first fibers 13a to form stitches 19 and to provide the fusion bonding between acoustical barrier 10 and carpet 12, as explained more fully below. If the thickness of first layer 13 is too great, then the fusion bonding between acoustical barrier 10 and carpet 12 can be compromised, and, moreover, is an expensive waste of fibers and unnecessarily increases the overall weight of the acoustical barrier 10. On the other hand, there must be sufficient first fibers 13a in first layer 13 to adequately form stitches 19 and to perform that fusion bonding function. It is for these reasons that the thickness and densities of first layer 13, defined above, are required.

The second layer 15 must provide the suspending function, as described above, and in order to achieve that task, the second layer 15 must have certain thicknesses and densities. In addition, second layer 15 must adequately engage and hold stitches 19 therein, so as to adequately bind the composite together. Thus, in the present invention, the suspending second layer 15 has a thickness of between about 0.2 inch and 5 inches, preferably between about 0.5 inch and 3 inches, and a density of between about 0.1 and 4.0 lbs. per cubic foot, preferably about 1.0 to 2.0 lbs. per cubic foot.

The high-density intermediate acoustical barrier layer 14, as noted above, is disposed between the first and second layers 13 and 15. That intermediate barrier layer 14 must have sufficient thickness and density (total mass) so as to act as an acoustical barrier, but, on the other hand, that barrier layer 14 must also be needleable, in order that stitches 19 may pass therethrough without substantially disrupting barrier layer 14. Thus, for these dual purposes, the barrier layer has a thickness of between about 0.01 inch and 0.5 inch and a density of at least 50 lbs. per cubic foot, preferably between about 100 and up to 200 lbs. per cubic foot, e.g. between 100 and 150 lbs. per cubic foot.

As opposed to the barrier layer of the prior art, the present barrier layer 14 is a substantially continuous film of high-density needleable polymeric material, as explained in more detail below.

The plurality of needled stitches 19, which are formed from the first fibers 13a and extend from first layer 13 through intermediate barrier layer 14 and at least into second layer 15, must bind together all of first layer 13, barrier layer 14 and suspending second layer 15 in such a manner that those layers become so consolidated that the acoustical barrier 10 can be handled, shipped, cut, conformed, molded and fusion bonded to the carpet 12 without the three layers becoming disrupted or substantially disengaged. On the other hand, the number of stitches 19 cannot be so great that the barrier layer 14 is substantially deteriorated from an acoustical attenuation point of view. Generally speaking, to achieve these results, the number of stitches 19 are from about 100 to about 600 stitches per square inch of the acoustical composite, and more preferably from about 150 to 500 or about 200 to 400 stitches per square inch of the acoustical composite.

The first fibers 13a, as noted above, must be needleable fibers in order to form stitches 19. Those first fibers 13a forming first layer 13 can be carded fibers or a needleable web of fibers. Thus, the first fibers 13a can simply be carded onto barrier layer 14, as explained in more detail below in connection with the process, or those first fibers 13a may simply be a pre-formed needleable web of fibers which is doffed onto barrier layer 14, again as explained in more detail below in connection with the process. However, to ensure that those first fibers 13a will adequately needle into stitches 19, those first fibers 13a should have a denier per filament of between about 1 and 35 and, preferably, a length between about 0.1 inch and 5 inches, preferably between about 1 inch and 3 inches. This ensures sufficient mobility of the fibers 13a that they can be engaged by the barbs of needles so as to form adequate stitches 19.

Almost any needleable textile fiber may be used for those first fibers 13a, since it is only the physical characteristics of the fiber, and not the chemical composition thereof, which is important. However, very conveniently, the first fibers 13a are chosen from one or more of polyester, polyolefin, cellulosic, polyamide, nylon, polyacrylic, aramid, imide, melamine fibers and polyvinyl chloride fibers (PVC).

In order to eliminate glue line 3 of the prior art, which adheres the acoustical barrier 1 of the prior art (see FIG. 1) to carpet 2, the present first layer 13 of the present composite should have as part of that layer a heat-fusible component 13b which is heat fusible at a temperature above 180° F. and contained in the first layer 13 in an amount of between about 10% and 70% by weight, preferably about 20% to 60% by weight, of the first layer 13. With such a fusible component 13b in first layer 13, after the present acoustical barrier 10 and carpet 12 are cut to be configured for the particular automobile, carpet 12, or the assembly of carpet 12 and acoustical barrier 10, or one or the other thereof, is heated and pressed in a configuring mold to mold the assembly of the carpet and acoustical barrier into a configuration generally along the lines of the configuration of the portion of the automobile which that assembly is to cover, e.g. the front floorboard of an automobile. This is a usual procedure in the prior art. However, when present first layer 13 includes a fusible component 13b, and when that molding is carried out (usually at temperatures in excess of 180° F.), the fusible component 13b in first layer 13 will tackify or melt, and when pressed in the mold, that fusible component 13b will fuse acoustical barrier 10 to the underside 12a of carpet 12 and thereby eliminate the glue line 3 of the prior art. The fusible component, not carrying solvents, extenders, or fugitive plasticizers and the like, will not contain volatile components and, therefore, avoids the off-gassing and oily condensation in the automobile, as explained above.

Figure 5:
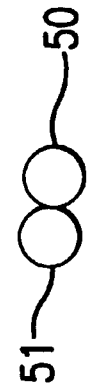
FIG. 5 is a diagrammatic cross-section of a bicomponent fiber used in an embodiment of the present acoustical barrier.
Figure 4:
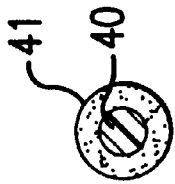
FIG. 4 is a diagrammatic cross-section of a sheath/core fiber used in an embodiment of the present acoustical barrier.

The fusible component 13b can be any of the usual fusible components, such as polyolefins or polyvinyl chlorides and the like. Most preferably, the heat-fusible component 13b is in a heat-fusible fiber form, e.g. the heat-fusible fiber form is a bicomponent fiber or a sheath/core fiber. FIG. 4 is a diagrammatic cross-section of a sheath/core fiber having a core 40 and a sheath 41. Typically, such a fiber will have a core 40 of polyester, cellulose, nylon and the like, as set forth above, and the sheath 41 will be the fusible component, e.g. a polyolefin or polyvinyl chloride. Alternatively, the heat-fusible fiber may be a bicomponent fiber, as shown in FIG. 5, where one component 50 is the heat-fusible component, as described above, and the second component 51 is also as described above, e.g. polyester fiber and the like. Alternatively, separate non-fusible and fusible fibers may be used.

As can be appreciated, when a fusible component 13b is used to adhere acoustical barrier 10 to carpet 12, the first layer 13 cannot be too thick, since if it is, that layer could separate during handling, forming and the like of the acoustical barrier 10 or when applied to or when handling of the assembly with carpet 12. Therefore, it is preferable that first layer 13 has a thickness of between about 0.01 and 0.5 inch, and more preferably between about 0.05 and 0.1 inch. This provides a tight first layer 13 but yet with sufficient fibers and depth of fibers to achieve stitches 19 by barbs of needles picking up the fibers to form stitches. This is particularly true when the first layer 13 has a density of between about 3 and 5 lbs. per cubic foot.

The suspending second layer 15 also may be in the form of carded fibers or a needleable web of fibers, as explained above in connection with first layer 13. However, the second fibers 15a, in order to provide the suspending function as described above, should have much higher deniers than the first fibers 13a of the first layer 13, and particularly deniers per filament of at least 5 and up to as much as 70, e.g. 15 to 60 denier per filament. The lengths of the second fibers 15a can be from about 0.5 to about 5 inches. Here again, the particular second fibers 15a, as with the first fibers 13a, are not critical from a chemical point of view, but are only of concern in connection with the above-noted function and mechanical aspects thereof, e.g. providing the suspending function. Thus, any composition may be used, but here again, the second fibers 15a may be one or more of polyester, nylon, polyolefin, cellulosic, polyamide, polyacrylic, aramid, imide, melamine and polyvinyl chloride (PVC) fibers.

Second layer 15, which provides the suspending action, as noted above, can have a thickness of between about 0.2 inch and 5 inches and a density of between about 0.1 and 4.0 lbs. per cubic foot, while still allowing the stitches to pass therethrough and supply the suspending function. However, more preferably, the thickness of the second layer 15 is between about 0.5 inch and 3 inches and the density is between about 1.0 and 2.0 lbs. per cubic foot. This will ensure that the stitches 19 may easily pass therethrough and still provide the required suspending function.

However, as can be appreciated from these thicknesses and densities, second layer 15 is not a very consolidated layer, and to ensure that second layer 15 retains consolidation during handling, forming and the like, again, it is preferred that the second layer 15 include a heat-fusible component 15b which is heat fusible at temperatures above about 180° F. and is contained in the second layer 15 in amounts of between about 5% and 40% by weight of the second layer 15, especially between about 10% to 30% by weight. Here again, the heat-fusible component is preferably in a heat-fusible fiber form, and more preferably, the heat-fusible fiber form is a bicomponent fiber or a sheath/core fiber, as shown in FIGS. 4 and 5, with the same or similar compositions as described above. Separate fusible and non-fusible fibers, however, may be used. However, in connection with the second layer 15, it is preferred that the heat-fusible fiber is a sheath/core fiber, since this will ensure fusing of the fibers 15a of second layer 15 at crossover points of fibers within second layer 15. Fusing of the fusible component 15b may take place when forming suspending layer 15, or forming acoustical barrier 10 but it can, although less desirably, take place when acoustical barrier 10 is fusion bonded to carpet 12, as explained above in connection with the molding process. However, it is preferred that fusing of the fusible component take place prior to needling for the reasons explained below.

The barrier layer 14, disposed between the first and second layers 13 and 15, must be a high density needleable polymeric material, as noted above, in order to attenuate sound of the relevant frequencies and allow the binding of the first and second layers with the barrier layer during the needling operation. Also as noted above, in order to attenuate acoustical sounds of the relevant frequencies, the density of the barrier layer 14 must be at least 50 lbs. per cubic foot and have a thickness of between 0.01 inch and 0.5 inch, but more preferably, to achieve these results, the barrier layer 14 has a thickness of between about 0.01 inch and 0.15 inch and a density of between about 100 and 150 lbs. per cubic foot. This will ensure adequate sound attenuation of the relevant frequencies and yet ensure adequate needling of the polymeric material for binding of the three layers. Of course, the density and the needleability of the barrier layer 14 will depend, to some extent, on the polymeric material chosen for the intermediate barrier layer. While a wide variety of polymeric materials are acceptable for the barrier layer, and the particular polymeric material is not critical, particularly good polymeric materials for the barrier layer 14 are one or more of rubber, synthetic rubbers, polyvinyl chloride (preferably with a polymerizable plasticizer), polyvinyl acetate, polyurethane, silicone rubber, polyethylenevinyl acetate and a polymer of ethylene-propylene dimer monomer (EPDA). These materials have special advantages in that they are soft enough to allow needle penetration without significantly tearing the material or breaking needles and, after the needles have been withdrawn, the material will substantially reseal the needle punched holes made by the needles due to the soft elastic nature of the polymeric material. As one skilled in the art readily appreciates, the existence of holes in the barrier layer decreases the sound abatement of that barrier layer in the relevant frequencies. With these softer and yieldable materials, the needle punch holes in the barrier layer 14 are largely resealed by the elastomeric movement of the soft material once the needles have been withdrawn therefrom. However, it is not necessary that the polymeric material have this latter property, since the needle punched holes, as noted above, are a relatively small number per square inch, and even if the polymeric material does not reseal the holes by elastomeric movement, the sound abatement at the relevant frequencies of the barrier layer will still be quite substantial.

The barrier layer 14 must, of course, have a high density, as noted above, so as to achieve sound abatement at the relevant frequencies. Lower densities require barrier layers of too great a thickness to achieve adequate total mass for adequate sound abatement. Normally, a polymeric material of the above-described nature, which forms the barrier layer 14, will not have densities as high as that desired. As is common in the art, such barrier layers are increased in density by the addition of a filler 23 thereto, and particularly a solid particulate filler, and especially a solid particulate material having a density greater than 1 gram per cubic centimeter. Generally, these fillers 23 are inorganic fillers, such as clay, metal or a metal compound, for example, kaolin clay and barium sulfate, although other high-density fillers may equally be used. The particular filler is not critical, and any of the prior art fillers may be used. With such fillers 23, the barrier layer 14 may have a density between about 50 and 200 lbs. per cubic foot, which is quite desirable for the relevant frequencies. Of course, for uniform sound abatement, the filler 23 is uniformly dispersed within the barrier layer 14. Such fillers 23 also provide some additional toughness to the polymeric material, which will ensure the ability of the needles to penetrate deeply into the second layer 15 and preferably extend all the way through the second layer 15, as shown in FIG. 2, without substantially disrupting the barrier layer 14. Even more preferably, as shown in FIG. 2, when the stitches penetrate beyond a lowermost surface 20 of second layer 15, the stitches can form a knot 21 of fibers outside of that lowermost surface 20 which further locks stitches 19 into place and which, consequently, locks all of layers 13, 14 and 15 together in a very consolidated acoustical barrier 10.

With an acoustical barrier 10, as described above, the composite of that acoustical barrier is easily fusion bonded at the top surface 22 of first layer 13 to the underside 12a of the carpet or felt 12 by the heating and molding technique described above in producing an automotive carpet or felt, i.e. the composition is fusion bonded to the carper or felt 12 by way of a heat-fusible component 13b of the first layer 13.

Figure 3:
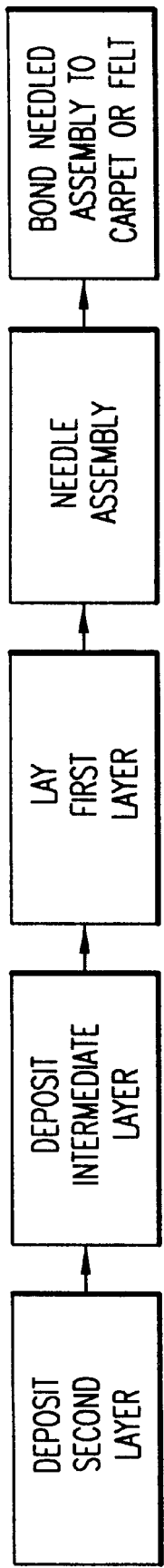
FIG. 3 is a block diagram of the steps of the present process.

Turning now to the method of the invention, and as diagrammatically illustrated in FIG. 3, the method comprises assembling of a composite of (i) the non-woven first layer 13 of needleable textile first fibers 13a, (ii) the non-woven low density second layer 15 of textile second fibers 15a, and (iii) the high-density intermediate acoustical barrier layer 14, which is disposed between the first and second layers 13, 15. This assembly of the composite may be carried out in a number of different ways. For example, the various layers may be assembled from pre-formed layers thereof simply by unrolling those pre-formed layers and placing the layers in the correct order, as described above. Alternatively, second layer 15 may be formed simply by carding fibers 15a from a supply thereof onto a conventional apron. A pre-form of the barrier 14 can then be unrolled and placed thereon. Likewise, the first layer 13 can be formed by carding fibers 13a onto the top of barrier layer 14, also while the second layer 15 and barrier layer 14 are on the apron.

Alternatively, second layer 15 may be a pre-form (preferably pre-heated to fuse fusible component 15b), and barrier layer 14 may be placed thereon as a pre-form or by conventional coating or extrusion techniques, e.g. from a heated thermoplastic form of barrier layer 14, such as polyvinyl chloride. Of course, that polymeric material will contain the fillers 23 described above. A coating or extrusion can be arranged to coat essentially only onto the topmost surface of second layer 15 (by flowing the coating or extrudant onto second layer 15) or it can be arranged to penetrate to a controlled depth into the topmost surface of layer 15 (by doctor blade coating of that layer). In these techniques, therefore, barrier layer 14 will contain some of the fibers of second layer 15 and reinforce barrier layer 14 for added strength. Also, some locking of barrier layer 14 to the second layer 15 will occur by those fibers being within barrier layer 14. When a pre-form of barrier layer 14 is used, that pre-form may also contain fibers for such reinforcing purposes. However, reinforcing fibers are not required and would only be used, essentially, for special purposes where additional strengths are required.

However, since a coating or extrusion technique requires additional equipment and environmental concerns, that is not the preferred form of the process.

The preferred form of the process is where first layer 13 and second layer 15 are either pre-formed or carded, as described above, and barrier layer 14 is a pre-form thereof.

After the assembly of the composite, the composite is needled with about 100 to 600 stitches per square inch, especially 150 to 500 and more preferably 200 to 400 stitches per square inch, in a conventional needle loom. Since it is only necessary to needle from one side of the composite (from the side of first layer 13) to consolidate that composite with stitches 19, a single-board loom may be used or only one board of a double-board loom. That needling, however, must be such that the stitches 19 formed from the first fibers 13a extend from the first layer 13 through the intermediate barrier layer 14 and at least into the second layer 15, and preferably through the second layer 15 to the lowermost surface 20 thereof, in order to, preferably, form knots 21.

When additional strength of the composite is required for special purposes, an additional layer or layers, similar to first layer 13, may be carded or laid on the top or bottom of second layer 15 (shown in FIG. 2 as layers 30, 31) and needling is performed from both sides of the barrier 10, e.g. in a double-board loom to form stitches (partially shown) from the opposite side of the composite, i.e. from lowermost surface 20 or from the underside of barrier layer 14. However, in such case, preferably, second layer 15 has the fusible component 15b fused so that little or no fibers from second layer 15 form stitches in this alternative embodiment.

Alternatively, any fusible component 15b in second layer 15 may be unfused during needing and needling is carried out from both sides of barrier layer 14. In this case, fibers from second layer 15 form some stitches. The needles forming stitches from second layer 15 should be less aggressive and fewer in number so as to not disrupt second layer 15. This needling, however, does provide a very well consolidated composite.

In the most preferred form of the process, first layer 13 is laid onto the top of barrier layer 14 either as a carded or a pre-formed layer, but in the case of a pre-formed layer, the fibers 13a must be sufficiently mobile during the needling operation such that the fibers 13a can be formed into stitches 19 and the composite needled as described above, and especially from both sides of the barrier layer 14. To ensure that mobility and form adequate stitches, the first layer 13 must have the thicknesses and densities described above.

After the acoustical barrier 10 is formed, that barrier 10 is fusion bonded to the carpet or felt 12 by the molding technique described above.

The invention will now be illustrated by the following example where all percentages and parts are by weight unless otherwise indicated, as is the same in the specification and claims.

EXAMPLE

A pre-formed suspending layer was purchased from the W. T. Burnett Company, and was composed of 15 denier per filament polyester fibers and a polyester/polyolefin sheath/core binder fiber, which had been fused in the layer. The binder fiber was 15% of the layer and the polyester fiber was 85% of the layer. The layer was 2 inches thick and had a density of 0.58 lbs. per cubic foot.

The first layer was made by carding a combination of 50% of the same binder fibers, 6 denier per filament and 2 inches average length, and 50% polyester fibers, 25 denier per filament and 2 inches average length. The density was about 2.7 lbs. per cubic foot.

A barrier layer was produced by Beckwith-Bemis Company from extruded polyvinyl chloride with 40% kaolin clay in fine particulate form so as to provide a barrier layer with a density of about 125 lbs. per cubic foot.

In the process, the first layer was carded as a web onto a conveyor apron by a camel back cross lapper to accumulate a web weight of about 0.2 ounce per square foot.

The barrier layer with a weight of about 9 ounces per square foot was unrolled onto the first layer on the conveyor apron.

A second layer of fine fibers which was the same as the first layer was carded onto the barrier layer.

The suspending layer with a weight of about 1.5 ounces per square foot was unrolled onto the top of the second fine fiber layer while on the conveyor apron.

The so-assembled layers were conveyed on the conveyor apron to a compressive batt feeder which compressed the assembly sufficiently to feed the assembly into a conventional needle loom.

The needle loom was a Shoou Shyng SDP 250 H 2×2. The speed of feed of the assembly through the loom was 11 linear feet per minute. The loom was set to run at 650 RPM with needle penetrations of 4 mm at the top of the assembly and 12 mm at the bottom of the assembly. The needles of the A/B boards (top boards) were loaded at 33% of capacity with Groz Beckert F333 needles and the C/D boards (bottom boards) were loaded at 16% of capacity with Groz Beckert C222 needles.

The needled acoustical barrier had a thickness of about 0.75 inch and a weight of about 11 ounces per square foot.

Figure 6:
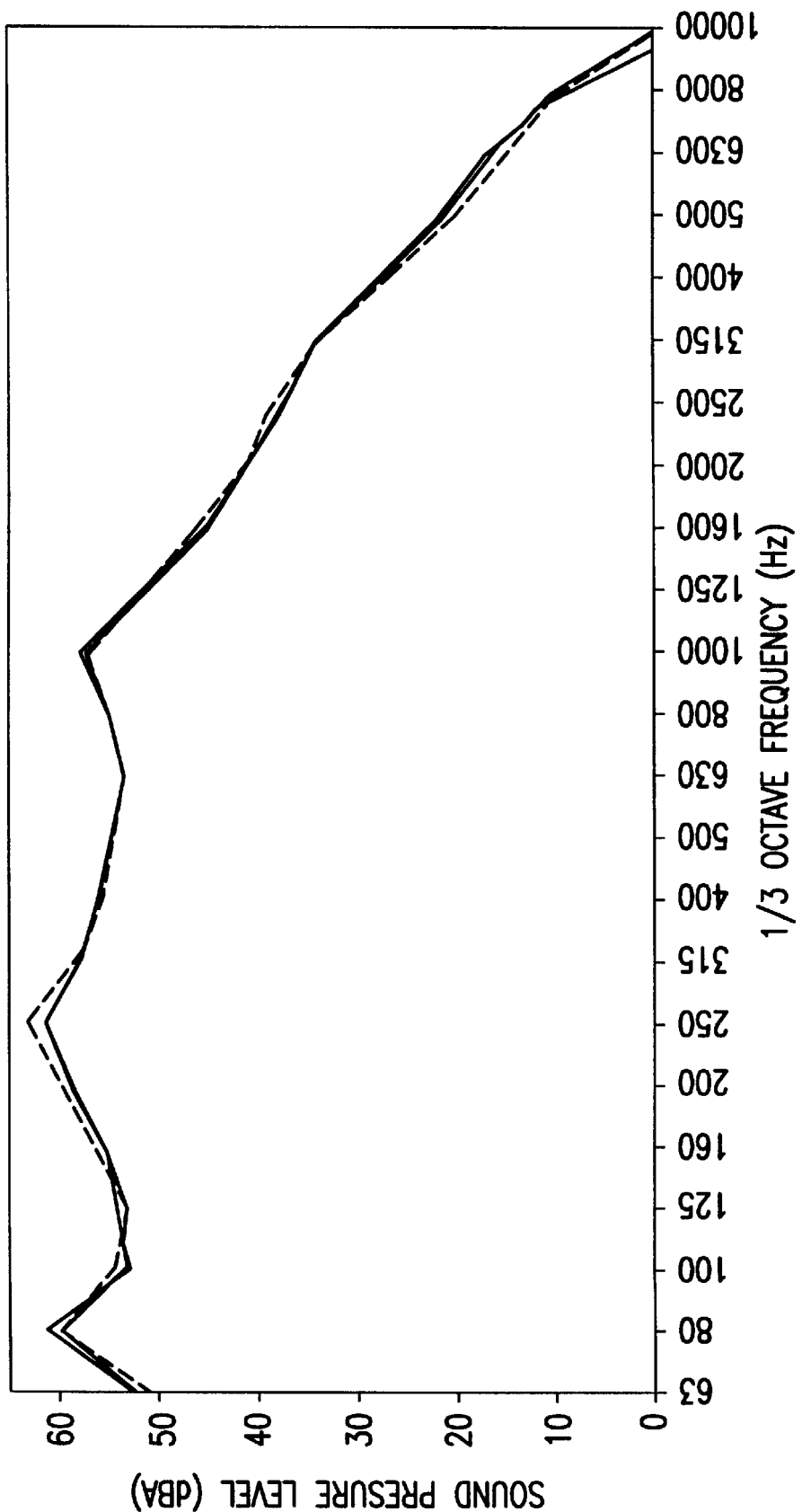
FIG. 6 is a graph comparing the acoustical response of the prior art acoustical barrier with the response of the present acoustical barrier.

The acoustical barrier was attached to a conventional automobile carpet by further bonding and tested for acoustical attenuation in a conventional sound transmission loss room (conventionally used by automobile manufacturers for testing acoustical barriers), along with an identical test of a conventional sound barrier glued to a conventional automobile carpet, which consisted of a cotton suspending layer and a back mastic applied to the underside of the carpet to which the conventional sound barrier was applied. The results are shown in FIG. 6, where the dashed line is the conventional barrier (about 15 ounces per square foot), and the two solid lines are the present barrier/carpet assembly. All tests were run at a simulated 45-MPH speed. The conventional barrier/carpet and one test of the present barrier/carpet were "mid-seat center" tests and one test of the present barrier/carpet was a "rear seat center" test.

As can be seen from FIG. 6, all three tests produced essentially the same results. Thus, the present invention can achieve sound abatement equally well as conventional acoustical barriers, but without the conventional glue lines and with reduced weight.

What is claimed is:

1. A needled composite acoustical barrier, comprising:
   (1) a non-woven first layer (13) of needleable textile first fibers (13a), said first layer (13) having a thickness of between about 0.01 inch and 0.5 inch and a density of between about 1.0 and 10 lbs. per cubic foot;
   (2) a non-woven, low density second layer (15) of textile second fibers (15a), said second layer (15) having a thickness of between about 0.2 inch and 5 inches and a density of between about 0.1 and 4.0 lbs. per cubic foot;
   (3) a high-density intermediate acoustical barrier layer (14) disposed between the first and second layers (13, 15), said intermediate barrier layer (14) having a thickness of between about 0.01 inch and 0.5 inch, a density of at least about 50 lbs. per cubic foot, and said barrier layer comprising a substantially continuous film of high-density needleable polymeric material; and
   (4) a plurality of needled stitches (19) formed from the first fibers (13a) and extending from the first layer (13), through the intermediate barrier layer (14) and at least into the second layer (15).

2. The composite of claim 1, wherein the first fibers (13a) are carded fibers or a needleable web of fibers.

3. The composite of claim 1, wherein the first fibers (13a) have deniers per filament of between about 1 and 35.

4. The composite of claim 1, wherein the first layer (13) includes a heat-fusible component (13b) which is heat fusible a temperature above about 180° F. and is contained in the first layer (13) in amounts of between 10% and 70% by weight of the first layer (13).

5. The composite of claim 1, wherein the first fibers (13a) are one or more of polyester, polyolefin, cellulosic, polyamide, nylon, polyvinyl chloride, polyacrylic, aramid, imide and melamine fibers.

6. The composite of claim 4, wherein the heat-fusible component is in a heat-fusible fiber form.

7. The composite of claim 6, wherein the heat-fusible fiber form is a bicomponent fiber or a sheath/core fiber.

8. The composite of claim 1, wherein the first layer (13) has a thickness of between about 0.05 inch and 0.1 inch.

9. The composite of claim 8, wherein the first layer (13) has a density of between about 3 and 5 lbs. per cubic foot.

10. The composite of claim 1, wherein the second layer (15) is in the form of carded fibers or a needleable web of fibers.

11. The composite of claim 1, wherein the second fibers (15a) have a denier of about 5 and 70.

12. The composite of claim 1, wherein the second layer (15) includes a heat-fusible component (15b) which is heat fusible at temperatures above about 180° F. and is contained in the second layer (15) in amounts between about 5% and 40% by weight of the second layer.

13. The composite of claim 1, wherein the second fibers (15a) are one or more of polyester, nylon, polyolefin, cellulosic, polyamide, polyacrylic, polyvinyl chloride, aramid, imide and melamine fibers.

14. The composite of claim 12, wherein the heat-fusible component is in a heat-fusible fiber form.

15. The composite of claim 14, wherein the heat-fusible fiber form is a bicomponent fiber or a sheath/core fiber.

16. The composite of claim 15, wherein the heat-fusible fiber is a sheath/core fiber.

17. The composite of claim 1, wherein the thickness of the second layer (15) is between about 0.5 inch and 3 inches and the density is between about 1.0 and 2.0 lbs. per cubic foot.

18. The composite of claim 1, wherein the intermediate barrier layer (14) has a thickness of between about 0.01 inch and 0.15 inch and a density of between about 100 and 150 lbs. per cubic foot.

19. The composite of claim 1, wherein the polymeric material of the intermediate barrier layer (14) is one or more of rubber, synthetic rubber, polyvinyl chloride, polyvinyl acetate, polyurethane, silicone rubber and polyethylenevinyl acetate and a polymer of ethylenepropylene dimer monomer.

20. The composite of claim 1, wherein the intermediate barrier layer (14) has therein a solid particulate filler (23) having a density greater than 1 gram per cubic centimeter.

21. The composite of claim 20, wherein the filler (23) is an inorganic filler.

22. The composite of claim 21, wherein the inorganic filler (23) is a clay, metal or metal compound.

23. The composite of claim 1, wherein the intermediate barrier layer (14) has a density between about 100 and 150 lbs. per cubic foot.

24. The composite of claim 20, wherein the filler (23) is uniformly dispersed within the intermediate barrier layer (14).

25. The composite of claim 1, wherein the stitches (19) extend through the second layer (15).

26. The composite of claim 1, wherein there are from about 100 to up to about 600 stitches (19) per square inch of the composite.

27. The composite of claim 26, wherein there are about 150 to 500 stitches (19) per square inch of the composite.

28. The composite of claim 1, wherein the composite is bonded at a top surface (22) of the first layer (13) to an underside (12a) of a carpet or felt (12).

29. The composite of claim 28, wherein the carpet or felt (12) is an automotive carpet or felt.

30. The composite of claim 28, wherein the composite is fusion bonded to the carpet or felt (12).

31. The composite of claim 30, wherein the fusion bonding is by way of a heat-fusible component of the first layer (13).

32. A method of producing a composite acoustical barrier, comprising:

(1) assembling a composite of (i) a non-woven first layer (13) of needleable textile first fibers (13a), said first layer (13) having a thickness of between about 0.01 inch and 0.5 inch and a density of between about 1.0 and 10 lbs. per cubic foot, (ii) a non-woven, low density second layer (15) of textile second fibers (15a), said second layer (15) having a thickness of between about 0.2 inch and 5 inches and a density of between about 0.1 and 4.0 lbs. per cubic foot, and (iii) a high-density intermediate acoustical barrier layer (14) disposed between the first and second layers (13, 15), said intermediate barrier layer (14) having a thickness of between about 0.01 inch and 0.5 inch, a density of at least 50 lbs. per cubic foot, and said barrier layer comprising a substantially continuous film of high-density needleable polymeric material; and (2) needling the composite with about 100 to 600 stitches per square inch, such that stitches (19) formed from the first fibers (13a) extend from the first layer (13), through the intermediate barrier layer (14), and at least into the second layer (15).

33. The method of claim 32, wherein the first fibers (13a) are carded fibers or a needleable web of fibers.

34. The method of claim 32, wherein the first fibers (13a) have deniers per filament of between about 1 and 35.

35. The method of claim 32, wherein the first layer (13) includes a heat-fusible component (13b) which is heat fusible a temperature above about 180° F. and is contained in the first layer (13) in amounts of between 10% and 70% by weight of the first layer.

36. The method of claim 32, wherein the first fibers (13a) are one or more of polyester, nylon, polyolefin, cellulosic, polyamide, nylon, polyacrylic, polyvinyl chloride, aramid, imide and melamine fibers.

37. The method of claim 35, wherein the heat-fusible component is in a heat-fusible fiber form.

38. The method of claim 37, wherein the heat-fusible fiber form is a bicomponent fiber or a sheath/core fiber.

39. The method of claim 32, wherein the first layer (13) has a thickness of between about 0.05 inch and 0.1 inch.

40. The method of claim 39, wherein the first layer (13) has a density of between about 3 and 5 lbs. per cubic foot.

41. The method of claim 32, wherein the second layer (15) is in the form of carded fibers or a needleable web of fibers.

42. The method of claim 32, wherein the second fibers (15a) have a denier per filament of about 5 and 70.

43. The method of claim 32, wherein the second layer (15) includes a heat-fusible component (15b) which is heat fusible at temperatures above about 180° F. and is contained in the second layer (15) in amounts between about 5% and 40% by weight of the second layer.

44. The method of claim 32, wherein the second fibers (15a) are one or more of polyester, nylon, polyolefin, cellulosic, polyamide, polyacrylic, polyvinyl chloride, aramid, imide and melamine fibers.

45. The method of claim 43, wherein the heat-fusible component is in a heat-fusible fiber form.

46. The method of claim 45, wherein the heat-fusible fiber form is a bicomponent fiber or a sheath/core fiber.

47. The method of claim 46, wherein the heat-fusible fiber is a sheath/core fiber.

48. The method of claim 32, wherein the thickness of the second layer (15) is between about 0.5 inch and 3 inches and the density is between about 1.0 and 2.0 lbs. per cubic foot.

49. The method of claim 32, wherein the intermediate barrier layer (14) has a thickness of between about 0.01 inch and 0.5 inch and a density of between about 100 and 150 lbs. per cubic foot.

50. The method of claim 32, wherein the polymeric material of the intermediate barrier layer (14) is one or more of rubber, synthetic rubber, polyvinyl chloride, polyvinyl acetate, silicone rubber and polyethylenevinyl acetate.

51. The method of claim 32, wherein the intermediate barrier layer (14) has therein a solid particulate filler (23) having a density greater than 1 gram per cubic centimeter.

52. The method of claim 51, wherein the filler (23) is an inorganic filler.

53. The method of claim 52, wherein the inorganic filler (23) is a clay, metal or metal compound.

54. The method of claim 32, wherein the intermediate barrier layer (14) has a density between about 100 and 150 lbs. per cubic foot.

55. The method of claim 51, wherein the filler (23) is uniformly dispersed within the intermediate barrier layer (14).

56. The method of claim 32, wherein the stitches (19) extend through the second layer (15).

57. The method of claim 32, wherein there are from about 150 to up to about 500 stitches (19) per square inch of the composite.

58. The method of claim 57, wherein there are about 200 to 400 stitches (19) per square inch of the composite.

59. The method of claim 32, wherein the composite is bonded at a top surface (22) of the first layer (13) to an underside (12a) of a carpet or felt (12).

60. The method of claim 59, wherein the carpet or felt (12) is an automotive carpet or felt.

61. The method of claim 59, wherein the composite is fusion bonded to the carpet or felt (12).

62. The method of claim 61, wherein the fusion bonding is by way of a heat-fusible component (13b) of the first layer (13).

* * * * *